(12) United States Patent
Terada et al.

(10) Patent No.: US 6,372,331 B1
(45) Date of Patent: Apr. 16, 2002

(54) BIODEGRADABLE CARD

(75) Inventors: Shigenori Terada, Shiga; Jun Takagi, Tokyo, both of (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 09/701,615

(22) PCT Filed: May 31, 1999

(86) PCT No.: PCT/JP99/02911

§ 371 Date: Jan. 8, 2001

§ 102(e) Date: Jan. 8, 2001

(87) PCT Pub. No.: WO99/62710

PCT Pub. Date: Dec. 9, 1999

(30) Foreign Application Priority Data

Jun. 3, 1998 (JP) ............................................ 10-154312
Sep. 24, 1998 (JP) ........................................... 10-269628

(51) Int. Cl.⁷ ........................ B32B 27/06; B32B 27/08; B32B 27/36
(52) U.S. Cl. ....................... 428/212; 428/480; 525/437; 525/444
(58) Field of Search ................................ 428/212, 480, 428/481, 483; 525/437, 444

(56) References Cited

FOREIGN PATENT DOCUMENTS

| JP | 07-207041 | * | 8/1995 |
| JP | 08-022618 | * | 1/1996 |
| JP | 08-252895 | * | 10/1996 |
| JP | 09-111107 | * | 4/1997 |

* cited by examiner

*Primary Examiner*—Vivian Chen
(74) *Attorney, Agent, or Firm*—Wenderoth, Lind & Ponack, LLP

(57) ABSTRACT

A biodegradable card comprising a laminated member having over-layers whose major component is a composition comprising 60–100 wt % of a polylactic acid and 40–0 wt % of a biodegradable aliphatic polyester having a glass transition temperature (Tg) of 0° C. or under on both sides of a core layer whose major component is a is composition comprising 40–90 wt % of a polylactic acid and 60–10 wt % of a biodegradable aliphatic polyester having a glass transition temperature (Tg) of 0° C. or under, characterized in that for the core layer and the over-layers, the crystallinities $\{(\Delta Hm-\Delta Hc))/\Delta Hm\}$ converted from the melting calorie after crystallizing ($\Delta Hm$) of the polylactic acid portion when the temperature is raised, and the crystallizing calorie ($\Delta Hc$) of the polylactic acid portion generated due to crystallization during the temperature rise are 0.8 or over and 0.9 or over, respectively.

10 Claims, No Drawings

BIODEGRADABLE CARD

TECHNICAL FIELD TO WHICH THE INVENTION BELONGS

The present invention relates to a plastic card that decomposes in natural environment. It particularly relates to a multilayered biodegradable card having superior flexibility and heat resistance.

Prior Art

While various kinds of plastic cards have heretofore been used in an extensive range, for many of them, their purpose of use comes to an end in a relatively short time and they are burned or discarded. On the other hand, from an environmental viewpoint, burning or discarding is not necessarily easy. Thus, various cards have been proposed which are made from biodegradable plastic materials.

For example, in Japanese patent publication 8-267968, it is proposed to form a multilayered structure having over-layers on both sides of a core layer from a biodegradable plastic, and use as the major component of the over-layers a polylactic acid or a copolymer of lactic acid and an oxycarboxylic acid in order to answer the requirement for clearness.

Problems To Be Solved

But even if the requirement for clearness can be answered by such a proposal, the following problems actually remain.

① A non-orientated sheet of polylactic acid is extremely brittle, so that when it is cut to a predetermined size by a cutter, cracks or chipping may develop, thus making it difficult to finish it beautifully. This is true for laminated sheets too. After such a sheet is formed into cards, embossed letters are sometimes mechanically formed. At such a time too, cracks or chipping may develop.

② An amorphous sheet of polylactic acid has a glass transition temperature of about 60° C., so that at temperatures over this point, the rigidity (or elastic modulus) drops sharply.

③ Further, in Japanese patent publication 8-267968, it is proposed to use a biaxially orientated sheet of polylactic acid. It is true that this method is effective in improving brittleness while keeping clearness of polylactic acid. But since strains remain in this state, there is a problem that the sheet may shrink due to heat produced during printing, laminating and other steps.

Means to Solve the Problems

The first subject matter of the present invention is to provide a biodegradable card which is a laminated member having over-layers whose major component is a composition comprising 60–100 wt % of a polylactic acid and 40–0 wt % of a biodegradable aliphatic polyester having a glass transition temperature (Tg) of 0° C. or under on both sides of a core layer whose major component is a composition comprising 40–90 wt % of a polylactic acid and 60–10 wt % of a biodegradable aliphatic polyester having a glass transition temperature (Tg) of 0° C. or under, characterized in that for the core layer and the over-layers, the crystallinities $\{(\Delta Hm-\Delta Hc))/\Delta Hm\}$ converted from the melting calorie after crystallizing ($\Delta Hm$) of the polylactic acid portion when the temperature is raised, and the crystallizing calorie ($\Delta Hc$) of the polylactic acid portion generated due to crystallization during the temperature rise are 0.8 or over and 0.9 or over, respectively.

The second subject matter of the present invention is to provide a core layer of a biodegradable card comprising as its major component a composition comprising 40–90 wt % of a polylactic acid in which the ratio of L-lactic acid to D-lactic acid is 100:0 to 94:6 or 6:94 to 0:100, and 60–10 wt % of a biodegradable aliphatic polyester having a glass transition temperature (Tg) of 0° C. or under, and the crystallinity $\{(\Delta Hm-\Delta Hc))/\Delta Hm\}$ converted from the melting calorie after crystallizing ($\Delta Hm$) of the polylactic acid portion when the temperature is raised, and the crystallizing calorie ($\Delta Hc$) of the polylactic acid portion generated due to crystallization during the temperature rise being 0.8 or over.

The third subject matter of the present invention is to provide an over-layer of a biodegradable card comprising as its major component a composition comprising 60–100 wt % of a polylactic acid in which the ratio of L-lactic acid to D-lactic acid is 100:0 to 94:6 or 6:94 to 0:100, and 40–0 wt % of a biodegradable aliphatic polyester having a glass transition temperature (Tg) of 0° C. or under, and the crystallinity $\{(\Delta Hm-\Delta Hc))/\Delta Hm\}$ converted from the melting calorie after crystallizing ($\Delta Hm$) of the polylactic acid portion when the temperature is raised, and the crystallizing calorie ($\Delta Hc$) of the polylactic acid portion generated due to crystallization during the temperature rise being 0.9 or over.

Embodiments of the Invention

In selecting a polylactic acid as one of the polymer components of the composition forming the core layer or the over-layers in the present invention, its crystallizability is important. For example, for an amorphous polylactic acid, since its rigidity drops sharply and it begins to flow above the glass transition temperature, if it is made into cards, heat resistance will be insufficient. This becomes a disadvantage in use. On the other hand, a sufficiently crystallized polylactic acid retains rigidity even above the glass transition temperature, though it slightly softens, and will not flow. That is to say, in the biodegradable card according to the present invention, it is preferable that in at least the core layer and preferably in both the core layer and the over-layers, the polylactic acid component has crystallized. For this purpose, it is important to select a crystallizable polylactic acid.

A The crystallizability of a polylactic acid depends on the types and contents of lactic acids forming it. Among polylactic acids, there are monopolymers of poly-L-lactic acid or poly-D-lactic acid whose structural unit is only L-lactic acid or D-lactic acid, and a copolymer containing both L-lactic acid and D-lactic acid as its structural units. Poly-L-lactic acid and poly-D-lactic acid which are monopolymers are both crystallizable. The copolymer becomes amorphous depending upon the contents of the L-lactic acid and D-lactic acid. That is to say, one in which the ratio between L-lactic acid and D-lactic acid in the copolymer is within the range of 94:6 to 6:94 is amorphous and will not crystallize even by heat treatment. Even if crystalled, its crystallinity is too low to satisfy heat resistance. In short, a crystalline polylactic acid is obtained if the ratio between L-lactic acid and D-lactic acid in the polymer is within the range of 100:0 to 94:6 or 6:94 to 0:100. Heat resistance improves by increasing crystallinity by e.g. heat treatment. But from the viewpoint of bonding sheets, the ratio between L-lactic acid and D-lactic acid in the polylactic acid polymer is preferably within the range of 98:2 to 94:6 or 6:94 to 2:98.

The manufacturing method of such a polylactic acid is not specifically limited, and such methods as condensation polymerization and ring opening polymerization may be used. As a monomer, L-lactic acid, D-lactic acid or their mixture is used for condensation polymerization, and L-lactide, D-lactide or DL-lactide, which are cyclic dimers of lactic acid, or their mixture is used for ring opening polymerization. Also, in order to increase the molecular weight, a small amount of a chain extender such as a diisocyanate compound, an epoxy compound or an acid anhydride may be used during polymerization.

The preferable weight-average molecular weight of the polylatic acid is 60 thousand to one million. If it is too small, practical physical properties will not exhibit. If it is too large, the melt viscosity will increase and formability and workability will be inferior. The glass transition temperature (Tg) of the polylactic acid is 60° C. The melting temperature (Tm) depends upon the ratio between L-lactic acid and D-lactic acid. An amorphous one has no melting temperature, while a crystalline one has a melting temperature of 100–200° C.

Another polymer component in the composition forming the core layer and the over-layers in the present invention is a crystalline aliphatic polyester having a low glass transition temperature (hereinafter simply referred to as "aliphatic polyester"). The aliphatic polyester can improve brittleness of the polylatic acid and improve shock resistance. If it also retains rigidity above the glass transition temperature of the polylactic acid, which is 60° C., the kind of polyester is not specifically limited. Two or more kinds may be mixed. Specifically, a biodegradable aliphatic polyester having a glass transition temperature (Tg) of 0° C. or under, preferably −20° C. or under should be used. Among them, in order to retain rigidity above 60° C., one having a melting temperature (Tm) of 80° C. or over is selected.

As representative examples of the aliphatic polyester used in the present invention, polyhydroxy butyrate and polyhydroxy butyrate/valerate (copolymer), which are biosynthesized by microorganisms can be cited. Also, polybutylene succinate (which is a condensation polymer of 1, 4-butane diol and succinic acid) and polybutylene succinate/adipate (copolymer), which are chemically synthesized by dehydration condensation polymerization an aliphatic dicarboxylic acid and an aliphatic diol, can be cited.

It is known that microorganism-produced aliphatic polyesters represented by polyhydroxy butyrate are biosynthesized by acetyl coenzyme A (acetyle CoA) in fungus such as Alkaligenes eutrophus. The aliphatic polyester thus produced is mainly poly-β-hydroxybutyric acid (poly3HB). But there is also poly(3HB-co-3HV) in which valeric acid units (HV) are copolymerized by an improved fermentation process to improve practical properties as a plastic. Its copolymerizing ratio is generally 0–40%. In this range, the melting temperature (Tm) is 130–165° C. Instead of HV, 4HB may be copolymerized or a long-chain hydroxy alkanoate may be copolymerized.

For chemically synthesized aliphatic polyesters represented by polybutylene succinate, an aliphatic diol unit, which is its one structural unit, is selected from ethylene glycol, propylene glycol, 1,4-butane diol, 1,4-cyclohexane dimethanol, etc. An aliphatic dicarboxylic acid unit, which is the other structural unit, is selected from succinic acid, adipic acid, suberic acid, sebacic acid, dodecanoic diacid, etc.

The manufacturing method of the aliphatic polyester is not specifically limited. It can be synthesized by condensation polymerization, ring opening polymerization or any other method. As a monomer, a mixture of at least one of the abovementioned diols and at least one dicarboxylic acid is used in condensation polymerization, and a mixture of at least one of oxyranes, which are ring-closed compounds of diols and dicarboxylic acids, and at least one acid anhydride is used in ring opening polymerization. As oxyranes, for example, ethylene oxide, propylene oxide, tetrahydrofuran, etc. can be cited. As anhydrides, anhydrides of succinic acid, adipic acid, etc. can be cited. In polymerizing, by selecting the mixing ratio of the monomer, it is possible to obtain a crystalline aliphatic polyester having any desired composition. Also, in order to increase the molecular weight, a small amount of a chain extender such as a diisocyanate compound, an epoxy compound or an acid anhydride may be added in polymerizing.

The transition temperature (Tg) and melting temperature (Tm) of the abovesaid aliphatic polyester, though depending upon the composition and the molecular weight, are about −60 to 0° C. and 90 to 170° C., respectively. Also, the weight-average molecular weight of the aliphatic polyester is preferably 50 thousand to one million. If it is too small, the melt tension will be too low to take up the sheet when melt-extruded. If it is too large, the melt viscosity will be too high, so that the formability and workability are inferior.

The major components of the core layer of the card of the present invention are 40-90 weight %, preferably 50–80 wt %, especially preferably 60–70 wt % of a polylactic acid, and 60–10 weight %, preferably 50–20 wt %, especially preferably 40–30 wt % of an aliphatic polyester. If the content of the aliphatic polyester is less than 10 wt %, improvement in the shock resistance is insufficient, so that it cannot withstand the embossing of letters. Also, when cutting the sheet, cracks or chipping tend to develop. If the aliphatic polyester exceeds 60 wt %, compared with e.g. existing vinyl chloride cards, the rigidity tends to be markedly insufficient and the sheet is difficult to handle.

The major components of the over-layers of the card of the present invention are 60–100 wt % of a polylactic acid, and 40–0 wt % of an aliphatic polyester. If the polylactic acid is less than 60 wt %, clearness will be insufficient. Ordinarily, since higher clearness is required for the over-layers than the core layers, a composition that is higher in the content of a polylactic acid than for the core layer is selected. If the sheets for the over-layers are orientated sheets, it is preferable that the content of polylactic acid is 100% in view of clearness as described below. For non-orientated sheets, compositions comprising preferably 70–90 wt % of a polylactic acid and 30–10 wt % of an aliphatic polyester, and especially preferably comprising 70–80 wt % of a polylactic acid and 30–20 wt % of an aliphatic polyester are preferable. The higher the content of an aliphatic polyester, the better in view of embossing of letters and cutting of the sheets. But clearness decreases. Thus, a suitable composition should be selected within the above ranges according to the intended use of the card.

As the film-forming method of the sheets used as the core layer and the over-layers of the card according to the present invention, a polylactic acid and an aliphatic polyester of a predetermined composition may be put into an extruder together with other polymers and additives, if necessary, to directly manufacture sheets. Also, the material may be extruded in an extruder into strands, cut into pellets, and put again into the extruder to manufacture sheets. Practically, to compensate for reduction in the moledular weight due to decomposition in the extruder, the polylactic acid and the aliphatic polyester are sufficiently dried to remove moisture beforehand, and melted in an extruder. The melt-extrusion temperature is selected within the range of 100–250° C. according to the melting temperature and composition of the polymers in the composition.

The polymer composition melt-extruded into sheets is preferably brought into contact with a rotating casting drum for cooling. The temperature of the casting drum should be usually 60° C. or under, though it depends upon the kind and composition of the polymer in the composition. At a temperature above 60° C., the polymer will stick to the casting drum, so that the sheet cannot be taken up. Especially if the sheet is orientated, it is preferable to keep the polylactic acid portion amorphous by rapid cooling so that no globulites develop due to promotion of crystallization of the polylactic acid portion.

According to the present invention, the thus obtained sheets for the core layer and the over-layers are cut to a size suitable to obtain an intended card as necessary, and bonded together to form a laminate. For example, a biodegradable card having ovet-layers on both sides of the core layer can be manufactured by hot pressing in which the sheets are hot-pressed under pressure with one or two sheets as core layers sandwiched between the sheets as over-layers. The press temperature is selected suitably according to the melting temperatures of the polylactic acid and the aliphatic polyester. As the pressing pressure, 5–40 kg/cm$^2$ is used. An advantage of using two sheets as core layers is that troublesome double-side printing is avoidable, and that a similar structure can be obtained by bonding the non-printed surfaces of two individually printed sheets.

But in order to cope with this with a manufacturing facility for conventional vinyl chloride cards, it is preferable to fuse them at a temperature of 150° C. or under. In this case, the ratio of L-lactic acid and D-lactic acid of the polylactic acid as a major component is set so that the sheets can be laminated together at a temperature of 150° C. or under. Specifically, the ratio of L-lactic acid and D-lactic acid of the crystalline polylactic acid in sheet of one of the core layer and over-layers is selected within the range of 98:2 to 94:6 or 6:94 to 2:98. In contrast, in the range in which either of L-lactic acid and D-lactic acid exceeds 98%, the crystallizability of the polylactic acid increases and the fusing temperature rises. In this case, even if they are laminated and hot-pressed at a temperature of 150° C. or under, no sufficient fusing strength is obtained between sheets, so that they will peel with a slight force. That is to say, for laminating of the sheets, fusion between the over-layers and the core layer, or if two or more core layers are used, and fusion between these core layers is important. Thus, if the over-layers are sheets comprising a polylactic acid in which the ratio of L-lactic acid and D-lactic acid is 98:2 to 94:6 or 6:94 to 2:98, even if the core layers are sheets comprising a polylactic acid in which one of L-lactic acid and D-lactic acid exceeds 98%, fusing strength improves. Of course, even in the reverse relation as above, similar effects are obtained. But in the case in which a plurality of core layers are laminated, it is preferable to use as core layers sheets in which the ratio of L-lactic acid and D-lactic acid is set within the above specific range.

As a laminating method of sheets, they may be heat-fused together or laminated together through an adhesive. In the former method, both sheets are fused together by heating them to a temperature slightly higher than the fusing temperature or melting temperature of the sheets. But if it markedly exceeds the fusing temperature, the sheets cannot retain their shapes and begin to flow. This method is effective if the crystallinity of the polylactic acid portion of the sheets is low because it is possible to progress crystallization of the polylactic acid portion simultaneously with fusion. The latter method using an adhesive (hot-melt type) is effective to laminate orientated, heat-set sheets in which the polylactic acid portion has been fully crystallized because they can be laminated together at a relatively low temperature.

In contrast, when the hot-press method is used, the temperature of the hot press is increased from room temperature to the laminating temperature, maintained at a constant temperature for several minutes, and then cooled. At this time, sheets comprising an amorphous polylactic acid crystallize simultaneously when fusion of the sheets occurs during a temperature rise. Here, sheets not containing a polylactic acid that do not inherently crystallize and an aliphatic polyester begin to flow. This makes it possible to manufacture satisfactory cards. When the temperature is further increased, part of the crystals begin to melt around the melting point, so that the sheets can be fused together. But care has to be exercised because if the melting point is far exceeded, the sheets could not retain their shape and begin to flow. In any case, in this step, the polylactic acid portion of the sheets crystallizes. This is an advantage by using a crystalline polylactic acid. Thus this is a method of obtaining a card having heat resistance suitable for practical use.

In the present invention, in order to obtain a heat-resistant card suitable for practical use, it is an extremely important point that the core layers and the over-layers formed by laminated in this way have been sufficiently crystallized. Also it is an advantage by using a crystalline polylactic acid. In the biodegradable card of the present invention, it is necessary that the crystallinity of the polylactic acid portion of the core layers be 0.8 or over and the crystallinity of the polylactic acid portion of the over-layers be 0.9 or over.

In the present invention, the crystallinity of the polylactic acid portion present in the sheets forming the core layers and the over-layers is defined by the following formula:

$$\text{Crystallinity} = (\Delta Hm - \Delta Hc)/\Delta Hm$$

Wherein $\Delta Hm$ is the melting calorie after crystallizing of the polylactic acid portion when the temperature is increased, and $\Delta Hc$ is the crystallizing calorie of the polylactic acid portion produced due to crystallization during a temperature rise. These calories are measured using a differential scanning calorimeter (DSC) under JIS K7122. Specifically, 10 mg in of specimens collected from the core layers and the over-layers or the materials for forming them were heated at a temperature-increasing rate of 10° C./minute to draw a DSC curve. $\Delta Hm$ (J/g) was measured from the heat-absorbing peak area of fusion that appeared around the melting temperature (Tm) of the polylactic acid and $\Delta Hc$ (J/g) was measured from the heat buildup peak area of crystallization that appeared around the crystallization temperature (Tc) of the polylactic acid during a temperature rise. Then the crystallinity was calculated by substituting these measured values in the above formula. The nearer the crystallinity is to 1.0, the higher the crystallization and the nearer it is to zero, the more amorphous. A yardstick for crystallizing is 0.8 or over. For those that do not inherently crystallize, no melting point appears.

Thus, it is important to set the conditions of the laminating step or the orientating/heat-set step so that the biodegradable card as a product can achieve the above predetermined crystallinity. In particular, since orientated and heat-set polylactic acid sheets can be crystallized while maintaining improvement in strength and brittleness and clearness as described in Japanese patent publications 7-2027041 and 7-205278, they are suitable for forming over-layers of a biodegradable card. But setting of the heat-set conditions is important as will be described hereinafter.

The orientating step is carried out by roll-orientating in which the sheets are orientated between two rolls having different peripheral speeds and/or by tenter-orientating in which they are orientated by enlarging the distance between clip rows while gripping the sheets with the clips using a tenter. If they are biaxially orientated, either simultaneous or successive orientating can be used. The orientating magnification of the sheets is 1.5–5 times, preferably 2–4 times in the longitudinal (length) direction and the lateral (width) direction. The orientating temperature is selected in the range of 50–90° C., preferably 55–80° C. The tenter orientating method is more advantageous because after the sheets have been orientated by a tenter, they can be heat-set in the tenter.

For the polylactic acid sheet to be used as the over-layers, it is preferable to control the degree of planar orientation ($\Delta P$) to $3.0\times10^{-3}$ or over, preferably $5.0\times10^{-3}$ to $30\times10^{-3}$ and further the crystallinity of the polylactic acid portion $\{(\Delta Hm-\Delta Hc)/\Delta Hm\}$ to 0.9 or over in the stage before they are laminated with the core layers into a laminate. That is to say, in the polylactic acid orientated sheets, brittleness which the material inherently possesses can be improved by increasing the degree of planar orientation ($\Delta P$), and the thermal dimentional stability, which lowers with an increase in the degree of planar orientation, can be improved by increasing the crystallinity.

The degree of planar orientation ($\Delta P$) indicates the degree of planar orientation in a surface direction relative to a thickness direction of the sheets, and is usually calculated by use of the following formula by measuring the refractive indexes in three normal axis directions:

$$\Delta p=((\gamma+\beta)/2)-\alpha(\alpha<\beta<\gamma)$$

Wherein $\gamma$ and $\beta$ are the refractive indexes of two axes normal to each other and parallel to the sheet surface, and $\alpha$ is the refractive index in a thickness direction of the sheets.

Although the degree of planar orientation ($\Delta P$) depends on the crystallinity and the crystal orientation, it largely depends on the molecular orientation in the sheet surfaces. Since an increase in $\Delta P$ means an increase in the molecular orientation in the sheet surface, especially relative to the flow direction of the sheets and/or a direction perpendicular thereto, this leads to increasing the strength of the sheets and improving brittleness. As a method of increasing the degree of planar orientation ($\Delta P$), besides every known sheet orientating method, a molecular orientating method using an electric field or a magnetic field can be employed.

But orientated sheets having the degree of planar orientation ($\Delta P$) increased are liable to heat shrinkage, so that warpage develops in cards finished. Heat-setting for controlling (suppressing) heat shrinkage of orientated sheets is carried out by heating them for 3 seconds or over to as high a temperature as possible at which fusion of the sheets will not occur. The temperature range should be (Tm-50) to Tm (° C.), preferably (Tm-30) to Tm (° C.) wherein Tm is the fusing temperature of the polylactic acid. It is preferable to increase the crystallinity of the polylactic acid portion of the sheets to 0.9 or over by heat-setting.

For the card of the present invention, as necessary, printing layer, heat-sensitive recording layer, etc. may be provided. They are preferably provided on the surfaces of the core layers or over-layers or between the layers. Also, if magnetic recording layer or the like is provided, it is preferable to form magnetic stripes or bury IC in the surface of the over-layers by a suitable method.

The thickness of the card according to the present invention depends upon the intended use, but for a cash card or a credit card, a thick one of about 500 $\mu$m–900 $\mu$m is used, and for a telephone card or a prepaid card, a thin one of about 50 $\mu$m–350 $\mu$m is used. The thickness of the over-layers is preferably 20–140 $\mu$m for a thick one, and about 20–100 $\mu$m for a thin one, but is not specifically limited.

EXAMPLES

Hereinbelow, the present invention is described in more detail by Examples.

Besides the conditions described in the description, measurements and evaluations shown in the Examples were carried out under the conditions as shown below.

(1) Glass transition temperature (Tg) and melting temperature (Tm)

Using a differential scanning calorimeter DSC-7 made by Perkin Elmer, they were measured under JIS K7121. 10 mg specimen was set and their temperature was raised to 200° C. at a temperature-raising rate of 10° C./minute, and they were maintained at this temperature for two minutes to completely fuse the specimen. The heat-absorbing peak temperature of fusion that appeared on a DSC curve when their temperature was reduced at a temperature-reducing rate of 10° C./minute was indicated as the fusing temperature (Tm). The temperature was further reduced, down to −60° C. and retained for two minutes. The temperature was again increased at a rate of 10° C./minute, and the mean value on the transition curve was indicated as the glass transition temperature (Tg). As a cooling medium for measurement below 0° C., liquid nitrogen was used.

(2) Degree of planar orientation ($\Delta P$)

Using refractive indexes ($\alpha$, $\beta$, $\gamma$) in three axes perpendicular to one another, measured using an Abbe refractometer, it was calculated.

(3) Crystallinity

Using the melting calorie ($\Delta Hm$) and the crystallizing calorie ($\Delta Hc$) measured using the same device as in (1), it was calculated.

(4) Cuttability

Ten cards were superposed on one another and cut by a cutting machine. Those for which good results were obtained were indicated by ◯. If there were problems, the details were described.

(5) Evaluation of embossing of letters

Using a manual embossing machine (DC830) made by Japan Data Card, letters were embossed on the cards. Those for in which good results were obtained were indicated by ◯. If there were problems, their details were described.

(6) Standards for credit cards with magnetic stripes (JIS X6310)

Under this standard, specimens were evaluated for the following six items:

① Tensile strength: Standard: 47.1 N/mm² or over. Actually measured values were described.

② Shock resistance: Not break or crack when a steel ball weighing 500 g was dropped from a height of 30 cm onto cards placed on a stiff horizontal plate. Those which showed good results were indicated by ◯. If there were problems, their details were described.

③ Softening temperature: Standard: 52° C. or over. Actually measured values were described.

④ Heat resistance: No change on the surface of the cards when they were immersed in warm water of 60° C. for five minutes. They were further evaluated similarly in warm water of 80° C. This test is an index of heat resistance of the cards. Those which showed good results were indicated by ◯. If there were problems, their details were described.

⑤ Tackiness: Not Sticking between cards when they were stored for 48 hours while applying a pressure of 4.9 kPa in an atmosphere of relative humidity of 90% at a temperature of 40° C. Those which showed good results were indicated by ◯. For X, sticking occurred between cards.

⑥ Humidity resistance: No change in the appearance when they were stored for 48 hours in an atmosphere of relative humidity of 90% at a temperature of 40° C. Those which showed good results were indicated by ◯. If there were problems, their details were described.

⑦ Ply separation resistance: Evaluated by a test method under JIS X6301 identification card standard. Sheets laminated and hot-pressed were cut into strips of 10 mm wide×100 mm. Cuts were then formed between layers (between an over-layer and a core layer or between two core layers) and their ends were slightly peeled by hand and were chucked to a tensile tester to calculate the peel strength. The distance between chucks was set at 40 mm and the pulling speed was set at 100 m/minute. The maximum tensile strength at that time was measured, which was indicated as the peel strength per 1 cm. The standard is 6 N/cm or over. Actually measured values and the results that satisfy the standard are indicated by ◯.

(7) Comprehensive evaluation

The measurement and evaluation results for items (4)–(6) were collectively used to evaluate the practicality of the cards in the following three stages:

◯: excellent

Δ: within allowable range

X: low in practicality

EXPERIMENT EXAMPLE 1

[Film-forming of Sheets for Core Layers]

15 parts by weight of retile titanium oxide (TR-700 made by Fuji Titanium Industry) was mixed into a polylactic acid (Lacty 1000 made by SHIMADZU Corporation) having a weight-average molecular weight of 200 thousand and obtained by subjecting lactide of L-lactic acid (D-lactic acid content: 1% or under) to ring-opening polymerization. The mixture was extruded into strands while melt-blending with a same-direction twin-screw extruder at a cylinder temperature of 210° C. and a die temperature of 200° C., and were cut to chips by a rotary blade. After the chips were sufficiently dried to remove moisture, using a T-die extruder at a cylinder temperature of 210° C. and a die temperature of 200° C., they were extruded onto cooling rolls having a surface temperature of 58° C. Sheets having a thickness of 560 μm were obtained.

[Film-forming of Sheets for Over-layers]

Except that titanium dioxide was not mixed, clear sheets of a polylactic acid and having a thickness of 100 μm were obtained in the same manner as with the sheets for core layers.

[Formation of Cards]

After images were printed on the surface of a sheet as the core layer using a silk printer, it was sandwiched between two sheets as the over-layers. The in laminate was hot-pressed for 10 minutes at a press temperature of 180° C. and a pressure of 10 kg/cm² after a temperature rise to obtain a triple-layer card comprising over-layer/core layer/over-layer. Crystallization progressed in the polylactic acid of the over-layers and the core layer during the hot-press step, so that a biodegradable card whose heat resistance has substantially improved was obtained.

For cards thus obtained, evaluation results are also shown in Table 1.

EXPERIMENT EXAMPLE 2

[Film-forming of Sheets as Core Layers]

A polybutylene succinate/adipate copolymer (Bionolle #3001 made by SHOWA Highpolymer) was blended into a polylactic acid (Lacty 1000 made by SHIMADZU Corporation) having a weight-average molecular weight of 200 thousand and obtained by subjecting lactide of L-lactic acid (D-lactic acid content: 1% or under) to ring-opening polymerization in the weight ratio of 85:15. 15 parts by weight of rutile titanium oxide (TR-700 made by Fuji Titanium Industry) was mixed into 100 parts by weight of the thus obtained biodegradable resin. The mixture was extruded into strands while melt-blending them in a same direction twin-screw extruder at a cylinder temperature of 210° C. and a die temperature of in 200° C. The strands were cut to chips by a rotary blade. After the chips were sufficiently dried to remove moisture, using a T-die extruder they were extruded at a cylinder temperature of 210° C. and a die temperature of 200° C. onto cooling rolls having a surface temperature of 58° C. to obtain sheets having a thickness of 560 μm.

[Film-forming of Sheets as Over-layers]

Except that they were blended so that the weight ratio of the polybutylene succinate/adipate copolymer (Bionolle #3001) to the polylactic acid (Lacty 1000) would be 90:10, clear sheets having a thickness of 100 μm were prepared in the same manner as with the sheets as core layers.

[Formation of Cards]

Except that the above sheets were used, biodegradable cards were obtained as in the same manner as in Experiment Example 1.

For cards thus obtained, evaluation results are shown in Table 1.

EXPERIMENT EXAMPLES 3, 4

Except that the materials were blended so that the weight ratios of Bionolle #3001 to Lacty 1000 would be 70:30 and 30:70 for sheets as core layers, and would be 80:20 and 70:30 for sheets as over-layers, biodegradable cards were obtained in the same manner as with Experiment Example 2.

For cards thus obtained, evaluation results are shown in Table 1.

EXPERIMENT EXAMPLES 5, 6

Except that instead of Bionolle #3001 used in Experiment Example 3, two kinds of polyhydroxy butyrate/valerate copolymer (Biopol D300G and D600G both made by Monsanto Co., Ltd.) were used, biodegradable cards were prepared in exactly the same manner as with Experiment Example 3.

For cards thus obtained, evaluation results are shown in Table 1.

EXPERIMENT EXAMPLES 7, 8

Except that instead of Lacty 1000 used in Experiment Example 3, a polylactic acid containing about 5% of a D-lactic acid component (EcoPLA 2000D by CARGILL Japan) and a polylactic acid containing about 10% of a D-lactic acid component and not crystallized even if subjected to heat treatment were used and the hot-pressing temperatures for laminating were set at 160° C. and 110° C., biodegradable cards were prepared in exactly the same manner as with Experiment Example 3.

EXPERIMENT EXAMPLE 9

[Film-forming of Sheets as Core Layers]

Sheets as core layers were prepared in the same manner as in Experiment Example 3.

[Film-forming of Sheets as Over-layers]

According to the film-forming method of the sheets as over-layers in Experiment Example 1, clear sheets comprising a polylactic acid and having a thickness of about 700 μm were prepared. Next, after the sheets had been pre-heated by metallic rolls, they were orientated by 2.5 times in a longitudinal direction between rolls having a peripheral speed difference while heating them by an infrared heater. Next, they were laterally orientated by 3.0 times by a tenter, and then heat-treated in the tenter to obtain orientated, heat-set sheets having a thickness of 100 μm. Conditions for orientation and heat treatment were as follows.

Longitudinal orientation:

Orientating temperature: 75° C.

Orientating magnification: 2.5 times

Lateral orientation:

Orientating temperature: 72° C.

Orientating magnification: 3.0 times

Heat treatment:

Heat treatment temperature: 130° C.

Heat treatment time: 20 seconds

[Formation of Cards]

After images had been printed on the surface of a sheet as a core layer using a silk printer, a toluene/MEK solution in which 8 parts by weight of polyisocyanate compound DES-MOJULE L-75 (made by BAYER) was mixed into 100 parts by weight of copolymeric polyester-family hot-melt adhesive (VYLON 300 made by TOYOBO) was applied to both sides of the sheet. It was dried at room temperature sufficiently to allow the solvent to volatize, and it was adjusted so that the thickness of the adhesive would be about 3 μm. It was then sandwiched between two orientated, heat-set sheets as over-layers, and the laminate was hot-pressed for 5 minutes at a press temperature of 110° C. and a pressure of 5 kg/cm$^2$ after a temperature rise to obtain a triple-layer biodegradable card comprising over-layer/core layer/over-layer. Crystallization progressed in the polylactic acid of the over-layers and the core layer during the hot-press step, so that a biodegradable card whose heat resistance had substantially improved was obtained.

For cards thus obtained, evaluation results are shown in Table 1.

EXPERIMENT EXAMPLE 10

Except that the heat treatment temperature during manufacture of orientated, heat-set sheets of polylactic acid as over-layers was 100° C., cards were prepared in exactly the same manner as in Experiment Example 9.

The cards obtained were marked in warpage and unsuitable as cards.

EXPERIMENT EXAMPLE 11

Except that both the longitudinal and lateral orientating magnifications during manufacture of orientated, heat-set sheets of polylactic acid as over-layers were 1.5 times, cards were manufactured in exactly the same manner as in Experiment Example 9.

EXPERIMENT EXAMPLE 12

[Film-forming of Sheets as Core Layers]

Except that instead of Lacty 1000 used in Experiment Example 9, EcoPLA2000D was used, sheets as core layers were obtained in the same manner as in Example 9.

[Film-forming of Sheets as Over-layers]

Instead of Lacty 1000 used in Experiment Example 9, EcoPLA2000D was used, and it was orientated and heat-treated under the following conditions to obtain sheets as over-layers.

Longitudinal orientation:

Orientating temperature: 75° C.

Orientating magnification: 3.0 times

Lateral orientation:

Orientating temperature: 75° C.

Orientating magnification: 3.5 times

Heat treatment:

Heat treatment temperature: 135° C.

Heat treatment time: 20 seconds

[Formation of Cards]

Biodegradable cards were prepared in the same manner as in Experiment Example 9.

For the cards obtained, the evaluation results are shown in Table 1.

EXPERIMENT EXAMPLE 13

Except that the application of adhesive in Example 9 was not carried out and the temperature and pressure were changed to 155° C. and 15 kg/cm$^2$, biodegradable cards were prepared in the same manner as in Experiment Example 12.

For cards thus obtained, evaluation results are also shown in Table 1.

EXPERIMENT EXAMPLE 14

Except that for lamination by hot-pressing, a polyester-family hot-melt adhesive (VYLON 300 made by TOYOBO) was used and the temperature and pressure were changed to 90° C. and 5 kg/cm$^2$, biodegradable cards were prepared in the same manner as in Experiment Example 3.

For cards thus obtained, evaluation results are shown in Table 1.

As shown in Table 1, in Experiment Example 1 in which only a resin-component polylactic acid was used, it is apparent that there are problems in the cuttability, embossing of letters and shock resistance.

In Experiment Examples 2–8 and 14, cards were manufactured by forming the core layers and the over-layers by mixing a polylactic acid and another aliphatic polyester. Among them, Experiment Example 4, in which the aliphatic polyester content is out of the range of the present invention, has problems in the tensile strength and heat resistance. Experiment Example 5 in which the glass transition temperature (Tg) was out of the range of the present invention, has problems in the cuttability and shock resistance. Further, Experiment Example 8, which is used a polylactic acid that inherently does not crystallize, and Experiment Example 14, in which an inherently crystallizable polylactic acid was used but it was not sufficiently crystallized, were low in tensile strength and heat resistance and thus not practical. Experiment Example 14 has also problem in tackiness.

Experiment Examples 9–13 are examples in which orientated sheets of polylactic acid are used as the over-layers. The characteristics obtained by using orientated, heat-set sheets of crystalline polylactic acid for the over-layers are that the softening temperature as the card increases and the tensile strength improves. Among them, Experiment Example 10, in which the heat treatment temperature was low and crystallinity was out of the range of the present invention, showed high warpage when formed into cards and thus not suitable for practical use. Also, Experiment 11 is within the range of claim 1 and practically usable tentatively, but since the degree of planar orientation is low (claim 3 not achieved), performance is slightly inferior in the cuttability, embossing of letters and shock resistance. On the other hand, for Experiment Example 13, in which lamination was carried out without using an adhesive, it is possible to suppress warpage and heat-fuse the layers by carrying out sufficient heat treatment and by hot-pressing around (or slightly over) the melting temperature of the polylactic acid used if it is within the range of the present invention.

EXPERIMENT EXAMPLES 15–22

[Film-forming of Sheets as Over-layers]

30 wt % of a polybutylene succinate/adipate copolymer (Bionolle #3001 made by SHOWA Highpolymer) was blended into a polylactic acid having a weight-average molecular weight of 200 thousand and obtained by subjecting a lactide of L-lactic acid (D-lactic acid content: about 0.8% or under) to ring-opening polymerization.

The mixture was extruded into strands while melt-blending them in a same-direction twin-screw extruder at a die temperature of 200° C., and the strands were cut to chips by a rotary blade. After the chips had been sufficiently dried to remove moisture, using a T-die extruder, they were extruded at a cylinder temperature of 210° C. and a die temperature of 200° C., onto cooled rolls having a surface temperature of 58° C. to obtain sheets having a thicknesses of 100 μm. These sheets as core layers were indicated by OA.

In the same manner, sheets having a thickness of 100 μm were prepared by blending a polybutylene succinate/adipate copolymer (Bionolle #3001 made by SHOWA Highpolymer) with polylactic acids having D-lactic acid contents of about 5.5% and about 10% (weight-average molecular weights being 180 thousand and 150 thousand) in the ratios shown in Table 2 in the same manner as above. These sheets as core layers are indicated by marks shown in Table 2. But for the sheets OC ·X·, no biodegradable aliphatic polyester was added.

[Film-forming of Sheets as the Core Layer]

30 wt % of a polybutylene succinate/adipate copolymer (Bionolle #3001 made by SHOWA Highpolymer) was blended into a polylactic acid (Lacty 1000 made by SHIMADZU Corporation) having a weight-average molecular weight of 200 thousand and obtained by subjecting a lactide of L-lactic acid (D-lactic acid content: about 0.8% or under) to ring-opening polymerization. Further, 12 parts by weight of rutile titanium oxide (TR-700 made by Fuji Titanium Industry Co., Ltd.) was mixed into 100 parts by weight of the thus obtained biodegradable resin. The mixture was extruded into strands while melt-blending them in a same-direction twin-screw extruder at a cylinder temperature of 210° C. and a die temperature of 200° C., and the strands were cut to chips by a rotary blade. After the chips had been sufficiently dried to remove moisture, using a T-die extruder, they were extruded at a cylinder temperature of 210° C. and a die temperature of 200° C., onto cooled rolls having a surface temperature of 58° C. to obtain sheets having a thicknesses of 280 μm and 560 μm. These sheets as both core layers were indicated by CA ①and CA ②.

In the same manner, sheets having a thickness of 280 μm were prepared by blending a polybutylene succinate/adipate copolymer (Bionolle #3001 made by SHOWA Highpolymer) or a polyhydroxy butylate/valerate copolymer (Biopol D600G made by Monsanto Co., Ltd.) with polylactic acids having D-lactic acid contents of about 2.5% and about 5.5% (having a weight-average molecular weights of 200 thousand and 180 thousand) in the ratios shown in Table 2 in the same manner as above. These sheets as core layers are indicated by marks shown in Table 2. But for the sheets CC ·X·, no biodegradable aliphatic polyester was added. In the Table, values with no unit indicated are in weight %.

[Forming of Cards]

Among the above core layers, images were printed on both sides of the sheets 560 μm thick and on one side of the sheets 280 μm thick. A sheet 560 μm thick, and two 280 μm thick sheets superposed with the non-printed sides facing each other, were sandwiched between two over-layers shown in Table 3 respectively. The temperature was raised to the laminating temperature shown in Table 3 under pressure of 10 kg/cm². After the temperature rise, the laminate was hot-pressed for 10 minutes to obtain three-layer or four-layer biodegradable cards comprising over-layer/core layer/over-layer or over-layer/core layer/core layer/over-layer. The laminating structures and evaluation results of the cards obtained were shown in Table 3.

From the results of Table 3, it is apparent that Experiment Examples 15–19 are superior in impact strength, heat resistance and tackiness, and peel resistance between the over-layers and the core layers and between the core layers when the core layer comprises two layers exceeded the standard.

On the other hand, Experiment Example 20 was especially low in peel resistance between the core layers, and low in practicality. This is because it is for thick core layers that are hard to transmit heat and because due to inherently high crystallinity, they had crystallized before bonding progress sufficiently. Experiment Example 21, because it contained no aliphatic polyester, was low in impact strength. Experiment Example 22, because it has over-layers containing a polylactic acid having a D-lactic acid content out of the range of the present invention, they were problematic in heat resistance and tackiness.

[Effect of the Invention]

According to the present invention, it is possible to provide a biodegradable card that is high in cuttability for forming into cards, letter embossing properties, tensile strength, shock strength and heat resistance.

TABLE 1

Biodearadable caid (various requirements and comprehensive evaluation)

|  | 1 | 2 | 3 | 4 | 5 | 6 | 7 | 8 | 9 | 10 |
|---|---|---|---|---|---|---|---|---|---|---|
| polylactic acid | LUCTY | LUCTY | LUCTY | LUCTY | LUCTY | LUCTY | LUCTY | amorphous | LUCTY | LUCTY |
| product name | 1000 | 1000 | 1000 | 1000 | 1000 | 1000 | 2000D |  | 1000 | 1000 |
| D body (%) | <1 | <1 | <1 | <1 | <1 | <1 | 5 | 10 | <1 | <1 |

TABLE 1-continued

Biodearadable caid (various requirements and comprehensive evaluation)

| | | | | | | | | | | |
|---|---|---|---|---|---|---|---|---|---|---|
| Tm (° C.) polyester | | 114 | 174 | 114 | 174 | 174 | 174 | 155 | None | 174 | 174 |
| ◇ core layer product name | | None | Bionolle #3001 | Bionolle #3001 | Bionolle #3001 | Biopole D300G | Biopole D600G | Bionolle #3001 | Bionolle #3001 | Bionolle #3001 | Bionolle #3001 |
| content (%) | | | 15 | 30 | 70 | 30 | 30 | 30 | 30 | 30 | 30 |
| Tg (° C.) | | | −45 | −45 | −45 | 10 | −10 | −45 | −45 | −45 | −45 |
| ◇ over-layer product name | | None | Bicnolle #3001 | Bionolle #3001 | Bionolle D300G | Biopole D300G | Biopole D600G | Bionolle #3001 | Bionolle #3001 | None | None |
| content (%) | | | 10 | 20 | 30 | 20 | 20 | 20 | 20 | | |
| Tg (° C.) | | | −45 | −45 | −45 | 10 | −10 | −45 | −45 | | |
| over-layer treating conditions | | | | | | | | | | | |
| orienting magnification (length × width) | | non-oriented | non-oriented | non-oriented | non-oriented | non-oriented | non-oriented | non-oriented | non-oriented | 2.5 × 3.0 | 2.5 × 3.0 |
| heat-fixing temperature (° C.) | | — | — | — | — | — | — | — | — | | |
| surface orientation degree (× $10^{-9}$) | | | | | | | | | | 6.1 | 5.9 |
| crystallinity | | | | | | | | | | 0.93 | 0.84 |
| laminating adhesive | | no | no | no | no | no | no | no | no | yes | yes |
| temperature crystillinity | | 180 | 180 | 180 | 180 | 180 | 180 | 160 | 110 | 110 | 110 |
| core layer | | 1.0 | 1.0 | 1.0 | 1.0 | 1.0 | 1.0 | 1.0 | 0 | 0.95 | 0.92 |
| over-layer | | 1.0 | 1.0 | 1.0 | 1.0 | 1.0 | 1.0 | 1.0 | 0 | 0.98 | 0.87 |
| comprehensive evaluation | | x | Δ | Δ | x | x | Δ | Δ | x | ○ | x |
| cuttability | | chipping occurred | ○ | ○ | ○ | chipping occurred | ○ | ○ | ○ | ○ | wrap produced in card |
| embossed letters evaluation of embossing | | crack occurred | ○ | ○ | ○ | ○ | ○ | ○ | ○ | ○ | |
| magnetic-striped credit card standard (JIS × 6310) | | | | | | | | | | | |
| tensile strength | | | | | | | | | | | |
| (N/n$^2$) | MD | 67 | 65 | 59 | 45 | 64 | 60 | 55 | 48 | 83 | |
| | TD | 66 | 58 | 55 | 45 | 61 | 56 | 50 | 46 | 82 | |
| shock strength | | crack occurred | ○ | ○ | ○ | crack occurred | ○ | ○ | ○ | ○ | |
| softening temperature (° C.) | | 52 | 50 | 48 | 46 | 52 | 51 | 49 | 47 | 59 | |
| heat resistance 60 ° C. | | ○ | ○ | ○ | marked waving | ○ | ○ | ○ | marked waving | ○ | |
| heat resistance 80 ° C. | | ○ | ○ | ○ | marked not kepted | ○ | ○ | ○ | shape not kept | ○ | |
| tackiness | | ○ | ○ | ○ | ○ | ○ | ○ | ○ | ○ | ○ | |
| humidity resistance | | ○ | ○ | ○ | ○ | ○ | ○ | ○ | ○ | ○ | |
| comprehensive evaluation | | x | Δ | Δ | x | x | Δ | Δ | x | ○ | x |

| | 11 | 12 | 13 | 14 |
|---|---|---|---|---|
| polylactic acid product name | LUCTY 1000 | ECOPLA 2000D | ECOPLA 2000D | LUCTY 1000 |
| D body (%) | <1 | 5 | 5 | 1 |
| Tm (° C.) polyester | 174 | 155 | 155 | 174 |
| ◇ core layer product name | Bionolle #3001 | Bionolle #3001 | Bionolle #3001 | Bionolle #3001 |
| content (%) | 30 | 30 | 30 | 30 |
| Tg (° C.) | −45 | −45 | −45 | −45 |
| ◇ over-layer product name | None | None | None | Bionolle #3001 |
| content (%) | | | | 20 |
| Tg (° C.) | | | | −45 |
| over-layer treating conditions | | | | |
| orienting magnification (length × width) | 1.5 × 1.5 | 3.0 × 3.5 | 3.0 × 3.5 | non-oriented |
| heat-fixing temperature (° C.) | 130 | 135 | 135 | — |
| surface orientation degree (× $10^{-9}$) | 1.9 | 4.7 | 4.7 | |

TABLE 1-continued

Biodearadable caid (various requirements and comprehensive evaluation)

| | | | | | |
|---|---|---|---|---|---|
| crystallinity | | 0.93 | 1.0 | 1.0 | |
| laminating adhesive | | yes | yes | no | yes |
| temperature | | 110 | 110 | 155 | 90 |
| crystillinity | | | | | |
| core layer | | 0.95 | 1.0 | 1.0 | 0.70 |
| over-layer | | 0.96 | 1.0 | 1.0 | 0.70 |
| comprehensive evaluation | | Δ | ○ | ○ | x |
| cuttability | | slight chipping occurred | ○ | ○ | ○ |
| embossed letters evaluation of embossing | | slight crack occurred | ○ | ○ | ○ | magnetic-striped credit card standard (JIS x 6310)

| | | | | | |
|---|---|---|---|---|---|
| tensile strength | | | | | |
| (N/n²) | MD | 71 | 80 | 73 | 57 |
| | TD | 67 | 78 | 72 | 54 |
| shock strength | | slight crack occurred | ○ | ○ | ○ |
| softening temperature (° C.) | | 58 | 58 | 58 | 47 |
| heat resistance 60 ° C. | | ○ | ○ | ○ | shape not kept |
| heat resistance 80 ° C. | | ○ | ○ | ○ | shape not kept |
| tackiness | | ○ | ○ | ○ | x |
| humidity resistance | | ○ | ○ | ○ | ○ |
| comprehensive evaluation | | Δ | ○ | ○ | x |

TABLE 2

Sheet Composition

| | sheet for over-layer | | | | Sheet for core layer | | | | | |
|---|---|---|---|---|---|---|---|---|---|---|
| sheet symbol | OA | OC① | OC② | OC‡ | OD | CA① | CA② | CB | CC① | CC② | CC‡ |
| polylactic acid (D = 0.8%) | 70 | | | | | 70 | 70 | | | | |
| polylactic acid (D = 2.5%) | | | | | | | | 70 | | | |
| polylactic acid (D = 5.5%) | | 70 | 80 | 100 | | | | | 70 | 70 | 100 |
| polylactic acid (D = 10%) | | | | | 70 | | | | | | |
| Bionolle #3001 | 30 | 30 | 20 | | 30 | 30 | 30 | 30 | 30 | | |
| Biopole D600G | | | | | | | | | | 30 | |
| titanium oxide | | | | | | 12 | 12 | 12 | 12 | 12 | 12 |
| thickness (μm) | 100 | 100 | 100 | 100 | 100 | 280 | 560 | 280 | 280 | 280 | 280 |

TABLE 3

Biodegrable card (various requirements and comprehensive evaluation)

| | Experiment Ex. 15 | Experiment Ex. 16 | Experiment Ex. 17 | Experiment Ex. 18 | Experiment Ex. 19 | Experiment Ex. 20 | Experiment Ex. 21 | Experiment Ex. 22 |
|---|---|---|---|---|---|---|---|---|
| laminating structure | | | | | | | | |
| over-layer | OA | OC① | OC① | OC② | OC① | OA | OC‡ | OD |
| core layer 1 | CB | CA② | CB | CC① | CC② | CA① | CC‡ | CC① |
| core layer 2 | CB | | CB | CC① | CC② | CA① | CC‡ | CC① |
| over-layer | OA | OC① | OC① | OC② | OC① | OA | OC‡ | OD |
| laminating temperature (° C.) | 150 | 140 | 130 | 130 | 130 | 150 | 130 | 110 |
| shock strength | ○ | ○ | ○ | ○ | ○ | ○ | cracked occured | ○ |
| heat resistance | ○ | ○ | ○ | ○ | ○ | ○ | ○ | x |

TABLE 3-continued

Biodegrable card
(various requirements and comprehensive evaluation)

| | Experiment Ex. 15 | Experiment Ex. 16 | Experiment Ex. 17 | Experiment Ex. 18 | Experiment Ex. 19 | Experiment Ex. 20 | Experiment Ex. 21 | Experiment Ex. 22 |
|---|---|---|---|---|---|---|---|---|
| tackiness | ○ | ○ | ○ | ○ | ○ | ○ | ○ | |
| ply separation strength (N/cm) | | | | | | | | |
| over-to-core | 6 | 9 | 12 | 18 | 16 | 6 | 19 | 17 |
| | ○ | ○ | ○ | ○ | ○ | ○ | ○ | ○ |
| core-to-core | 7 | — | 8 | 9 | 7 | 3 | 9 | 7 |
| | ○ | | ○ | ○ | ○ | x | ○ | ○ |
| crystallinity | | | | | | | | |
| core layer | 1.0 | 1.0 | 1.0 | 1.0 | 1.0 | 1.0 | 1.0 | 0 |
| over-layer | 1.0 | 1.0 | 1.0 | 1.0 | 1.0 | 1.0 | 1.0 | 0.97 |
| comprehensive evaluation | ○ | ○ | ○ | ○ | ○ | x | x | x |

What is claimed is:

1. A biodegradable card which is a laminated member having over-layers whose major component is a composition comprising 60–100 wt % of a polylactic acid and 40–0 wt % of a biodegradable aliphatic polyester having a glass transition temperature (Tg) of 0° C. or under on both sides of a core layer whose major component is a composition comprising 40–90 wt % of a polylactic acid and 60–10 wt % of a biodegradable aliphatic polyester having a glass transition temperature (Tg) of 0° C. or under, characterized in that for said core layer and said over-layers, the crystallinities {(ΔHm–ΔHc))/ΔHm} converted from the melting calorie after crystallizing (ΔHm) of the polylactic acid portion when the temperature is raised, and the crystallizing calorie (ΔHc) of the polylactic acid portion generated due to crystallization during the temperature rise are 0.8 or over and 0.9 or over, respectively.

2. The biodegradable card as claimed in claim 1 wherein said polylactic acids in said core layer and said over-layers are both crystalline polylactic acids in which the ratio between L-lactic acid and D-lactic acid is 100:0 to 94:6 or 6:94 to 0:100.

3. The biodegradable card as claimed in claim 1 wherein said polylactic acids in said core layer and said over-layers are both crystalline polylactic acids in which the ratio between L-lactic acid and D-lactic acid is 98:2 to 94:6 or 6:94 to 2:98.

4. The biodegradable card as claimed in claim 1 wherein oriented sheets are used for said over-layers, and wherein said oriented sheets have the degree of planar-orientation (ΔP) of 3.0×10$^{-3}$ and a crystallinity {(ΔHm–ΔHc))/ΔHm} of 0.9 or over in a stage before laminated on said core layer.

5. The biodegradable card as claimed in claim 4 wherein said oriented sheets used for said over-layers are formed of a polylactic acid.

6. The biodegradable card as claimed in any of claims 1–5 wherein the layer structure is over-layer/core layer/over-layer, or over-layer/core layer/core layer/over-layer.

7. A core layer of a biodegradable card comprising as its major component a composition comprising 40–90 wt % of a polylactic acid in which the ratio of L-lactic acid to D-lactic acid is 100:0 to 94:6 or 6:94 to 0:100, and 60–10 wt % of a biodegradable aliphatic polyester having a glass transition temperature (Tg) of 0° C. or under, and the crystallinity {(ΔHm–ΔHc))/ΔHm} converted from the melting calorie after crystallizing (ΔHm) of the polylactic acid portion when the temperature is raised, and the crystallizing calorie (ΔHc) of the polylactic acid portion generated due to crystallization during the temperature rise being 0.8 or over.

8. The core layer of a biodegradable card as claimed in claim 7 wherein said polylactic acid is a crystalline polylactic acid in which the ratio of L-lactic acid to D-lactic acid is 98:2 to 94:6 or 6:94 to 2:98.

9. An over-layer of a biodegradable card comprising as its major component a composition comprising 60–100 wt % of a polylactic acid in which the ratio of L-lactic acid to D-lactic acid is 100:0 to 94:6 or 6:94 to 0:100, and 40–0 wt % of a biodegradable aliphatic polyester having a glass transition temperature (Tg) of 0° C. or under, and the go crystallinity {(ΔHm–ΔHc))/ΔHm} converted from the melting calorie after crystallizing (ΔHm) of the polylactic acid portion when the temperature is raised, and the crystallizing calorie (ΔHc) of the polylactic acid portion generated due to crystallization during the temperature rise being 0.9 or over.

10. The over-layer of a biodegradable card as claimed in claim 9 wherein said polylactic acid is a crystalline polylactic acid in which the ratio of L-lactic acid to D-lactic acid is 98:2 to 94:6 or 6:94 to 2:98.

* * * * *